US006381008B1

(12) United States Patent
Branagh et al.

(10) Patent No.: US 6,381,008 B1
(45) Date of Patent: Apr. 30, 2002

(54) METHOD AND SYSTEM FOR IDENTIFYING ETCH END POINTS IN SEMICONDUCTOR CIRCUIT FABRICATION

(75) Inventors: Wayne A. Branagh; Robert C. Fry, both of Omaha, NE (US); Juan C. Ivaldi, Foster City, CA (US); Jason A. Rivers; Michael R. Dyas, both of Omaha, NE (US); Robert M. Brown, Jr., Western, NE (US)

(73) Assignee: SD Acquisition Inc., Omaha, NE (US)

( * ) Notice: Subject to any disclaimer, the term of this patent is extended or adjusted under 35 U.S.C. 154(b) by 0 days.

(21) Appl. No.: 09/318,402

(22) Filed: May 25, 1999

Related U.S. Application Data

(60) Provisional application No. 60/090,086, filed on Jun. 20, 1998.

(51) Int. Cl.[7] .................................................. G01J 3/18
(52) U.S. Cl. .......................... 356/72; 356/328; 700/121
(58) Field of Search ................................. 356/326, 328, 356/334, 72; 700/121

(56) References Cited

U.S. PATENT DOCUMENTS

| 5,026,160 A | * | 6/1991 | Dorain et al. ................ 356/328 |
| 5,991,023 A | * | 11/1999 | Morawski et al. .......... 356/326 |
| 6,088,096 A | * | 7/2000 | Aoki et al. .................. 356/316 |
| 6,181,418 B1 | * | 1/2001 | Palumbo et al. ............ 356/328 |

* cited by examiner

Primary Examiner—F. L. Evans
(74) Attorney, Agent, or Firm—James D. Welch

(57) ABSTRACT

Disclosed is a spectrometer system with unique wavelength resolution improving relative positioning of diffraction grating and detector. Also disclosed is a modified evolving windowed factor analysis based method of detecting semiconductor etch end points which is particularly well suited for use in real time monitoring and process control. Use of wavelength group selecting mask filters is also disclosed.

40 Claims, 7 Drawing Sheets

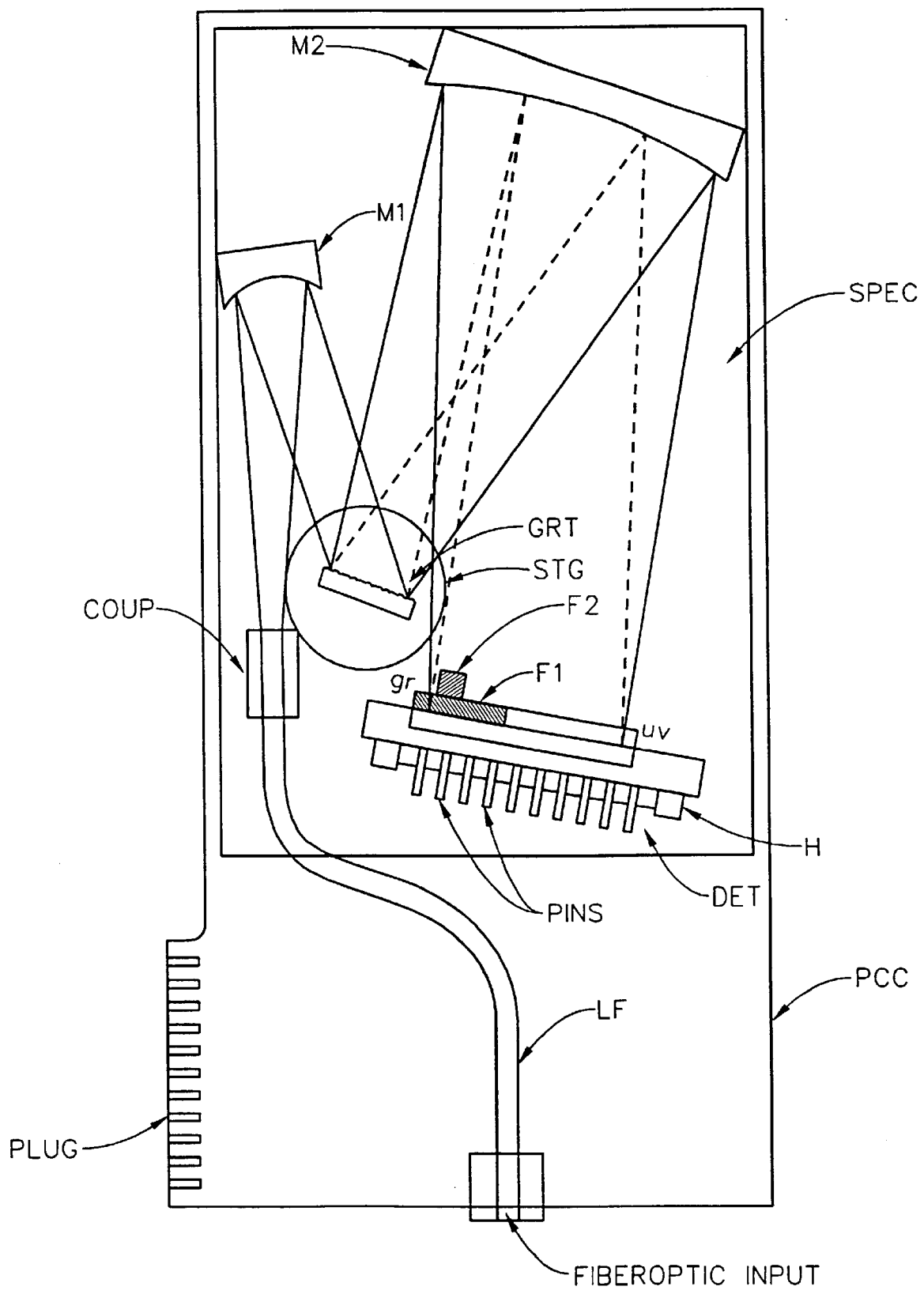
FIG. 1a1

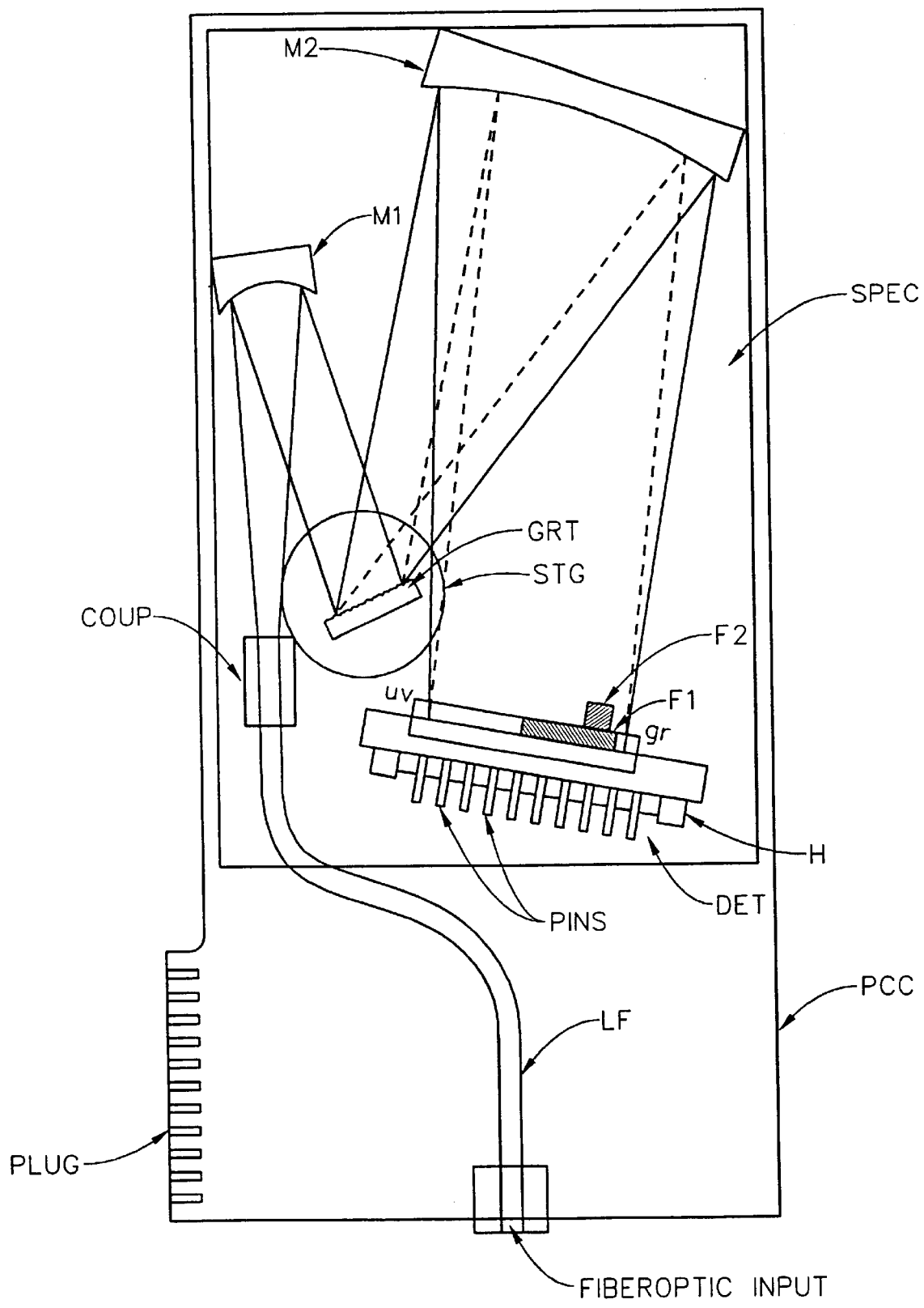
FIG. 1a2

A
PROVIDING A SEMICONDUCTOR ETCH END-POINT DETECTING SYSTEM COMPRISING A VACUUM CHAMBER WITH A SEMICONDUCTOR SYSTEM THEREIN, IN COMBINATION WITH A SPECTROMETER SYSTEM DETECTOR MEANS, AND THEN CHRONOLOGICALLY REPEATEDY PERFORMING THE FOLLOWING STEPS B. THROUGH E. IN AN EVOLVING WINDOWED FACTOR ANALYSIS SEQUENCE, UNTIL DETECTING SEMICONDUCTOR ETCH END POINT.

B
DURING A SEMICONDUCTOR ETCH PROCEDURE IN SAID VACUUM CHAMBER, OBTAINING A CHRONOLOGICAL SEQUENCE OF ELECTROMAGNETIC RADIATION INTENSITY VS. WAVELENGTH SPECTRA FROM SAID SPECTROMETER SYSTEM DETECTOR MEANS, AND OPTIONALLY APPLYING SIGNAL TO NOISE RATIO ENHANCING TECHNIQUE(S) TO SAID OBTAINED SPECTRA, AND OPTIONALLY IDENTIFYING CRITICAL WAVELENGTHS AND DELETING INTENSITY VALUES AT OTHER WAVELENGTHS IN SAID CHRONOLOGICAL SEQUENCE OF ELECTROMAGNETIC SPECTRA.

C
SELECTING SOME NUMBER OF ELECTROMAGNETIC RADIATION INTENSITY V. WAVELENGTH SPECTRA FROM SAID CHRONOLOGICAL SEQUENCE OF ELECTROMAGNETIC RADIATION INTENSITY VS. WAVELENGTH SPECTRA AND FORMING THEM INTO A DATA MATRIX, AND OPTIONALLY DELETING ROWS OR COLUMNS FROM SAID DATA MATRIX.

D
APPLYING MATHEMATICAL MATRIX DECOMPOSITION TECHNIQUES TO SAID DATA MATRIX AND DETERMINING VALUE(S) OF AT LEAST ONE REPRESENTATIVE PARAMETER (S), EACH OF SAID REPRESENTATIVE PARAMETER(S) BEING SELECTED FROM THE GROUP CONSISTING OF: (MEMBERS OF A DIAGONAL MATRIX AND EIGENVALUES).

E
DETECTING SEMICONDUCTOR ETCH END POINT BASED UPON CHANGE IN SAID AT LEAST ONE REPRESENTATIVE PARAMETER VALUE(S) RESULTING FROM SAID CHRONOLOGICALLY REPEATED PERFORMANCE OF STEPS B. THROUGH E.

FIG. 4

$$[x] = \begin{bmatrix} a1 & a2 & a3 & a4 & a5 \\ b1 & b2 & b3 & b4 & b5 \\ c1 & c2 & c3 & c4 & c5 \\ d1 & d2 & d3 & d4 & d5 \\ e1 & e2 & e3 & e4 & e5 \end{bmatrix}$$

$$[x] = \begin{bmatrix} a1 & a2 & a3 & a4 & a5 & a6 & a7 \\ b1 & b2 & b3 & b4 & b5 & b6 & b7 \\ c1 & c2 & c3 & c4 & c5 & c6 & c7 \\ d1 & d2 & d3 & d4 & d5 & d6 & e7 \\ e1 & e2 & e3 & e4 & e5 & e6 & e7 \end{bmatrix}$$

METHOD AND SYSTEM FOR IDENTIFYING ETCH END POINTS IN SEMICONDUCTOR CIRCUIT FABRICATION

RELATIONSHIP TO CO-PENDING APPLICATIONS

This application claims priority based on commonly assigned Provisional Patent Application Serial No. 60/090,086, filed Jun. 20, 1998.

TECHNICAL FIELD

The present invention is related to semiconductor circuit fabrication, and more particularly to a method of identifying process end points which is particularly well suited for use in real time monitoring and process control. The present invention further comprises a preferred high wavelength resolution spectrometer system for use in developing intensity vs. Wavelength spectra, which are utilized in practice of said method.

BACKGROUND

It is well known that in the fabrication of semiconductor circuitry, (e.g. integrated circuits), it is necessary to perform etching procedures. For instance, it is common to grow silicon dioxide atop a silicon substrate of a doping type, and then, utilizing photolithography techniques, open windows in said silicon dioxide, so that an opposite type dopant can be diffused into the underlying silicon. Resulting PN junctions are rectifying, and when multiple PN junctions are placed in appropriate relationship to one another, bipolar and mosfet transistors, as well as silicon controlled rectifiers etc., result. Interconnection of various such devices fabricated on a semiconductor substrate, it is noted, results in an integrated circuit.

The etching of silicon dioxide, (a very relevant example of an area of application of the present invention), can be accomplished in an etching chamber which contains fluorine or chlorine in the presence of a plasma. A reduced pressure, (e.g. $10^{-5}$ Torr), ambient into which is introduced $CF_4$, or more commonly, $C_2F_6$ or $C_4F_8$, gas is often utilized in industrial settings. While silicon dioxide is being etched in such a setting, certain etch products are formed, and if a beam of electromagnetic radiation is caused to pass through them, said products relatively strongly absorb energy at specific wavelengths, while energy present at other wavelengths is less strongly affected. Alternatively, energy provided by a present plasma serves to excite etch products and emissive electromagnetic radiation therefrom can be monitored. Careful monitoring of such intensity vs. wavelength spectra as a function of time can provide insight as to when silicon dioxide available for etching has been etched away, and when underlying silicon is reached. For instance, upon reaching silicon, the products of etching silicon dioxide are greatly reduced, (some small amount of said silicon dioxide etch products can still be produced as a result of typically undesirable overetching laterally under photoresist defined boundaries, however). And it is possible that new products due to interaction of plasma and etching gas with silicon will appear and affect monitored intensity vs. wavelength spectra. This is particularly true where some oxygen is present and the underlying silicon is etched. However, the products of said interaction of plasma and etching gas with silicon, it is to be understood, typically demonstrate very different electromagnetic spectrum absorbance and/or emission characteristics. It is to be understood that the procedure comprising detection of products of an etch procedure as an indication of etch end point, can be practiced where other than silicon dioxide is etched, (e.g. Al, SiN and W).

A recent paper which describes the use of low pressure high density plasma etching of silicon dioxide is titled "Chemical Challenge of Submicron Oxide Etching", by McNevin et al., J. Vac. Technol. B 15(2) (March/April 1997).

Another paper is titled "An Integrated System of Optical Sensors For Plasma Monitoring And Plasma Control", Anderson & Splichal, SPIE Vol. 2091, (1994). Real-time plasma etching utilizing sensors which measure plasma properties directly related to desired wafer features are discussed.

A paper by Splichal & Anderson titled "Application of Chemometrics to Optical Emission Spectroscopy For Plasma Monitoring", SPIE Vol. 1595, (1992) is also identified as monitoring of real-time plasma etching processes, based upon sensors which measure plasma properties that relate directly to desired etch features, is discussed.

A paper by Benson et al. titled "Sensor Systems For Real-time Feedback Control Of Reactive Ion Etching", J. Vac. Sci. Technol. B 19(1), (January/February 1996), is identified as it describes use of an optical emission spectroscopy system sensor utilized in multivariant feedback control of plasma etching of wafers.

A paper titled "Etching—0.35 m Polysilicon Gates On A High-Density Helicon Etcher", by Kroft et al., J. Vac. Sci. Technol. B 14(1) (January/February 1996), is disclosed as it describes an example of application plasmas in selective polysilicon-to-oxide plasma etching procedures.

A paper by Oh, Stanton, Anderson & Splichal titled "In Situ Diode Laser Absorption Measurements Of Plasma Species In A Gaseous Electronics Conference Reference Cell Reactor", J.Vac. Sci. Technol B 13(3) (May/June 1995). is identified as it discusses monitoring of electromagnetic absorption during etching procedures.

A paper by Manukonda & Dillon titled "Optical Emission Spectroscopy of $H_2$—CO and $H_2O$—$CH_3OH$ Plasmas For Diamond Growth", J.Vac. Sci. Technol. A 13(3) (May/June 1995), is identified as it describes monitoring of electromagnetic emissions during a procedure in which diamond was grown.

A paper by Litvak, titled "End Point Control Via Optical Emission Spectroscopy", J. Vac. Sci. Technol. B 14(1) (January/February 1996) describes the use of optical emission spectroscopy in identifying oxide etch end points, utilizing a conventional monochromator/photomultiplier system in conjunction with an end-point detecting algorithm. Many additional papers which describe plasma etching in the semiconductor fabrication area exist.

Known papers which utilize Reflected Electromagnetic Radiation Intensity and Ellipsometry to investigate Etching of semiconductor systems are:

"Optical Etch-Rate Monitoring Using Active Device Areas: Lateral Interference Effects", by Heimann, J. Electrochem. Soc., Vol. 132, No. 8, (1985);

"Ultraviolet-Visible Ellipsometry For Process Control During The Etching Of Submicron Features", by Blayo et al., J. Op. Soc. Am., Vol. 12, No. 3, (1995);

"Multiwavelength Ellipsometry For Real-Time Process Control Of The Plasma Etching Of Patterned Samples", Maynard et al., J. Vac. Sci. Technol. B 15(1) (1997); and "Optical Etch Rate Monitoring: Computer Simulation Of Reflectance", Heimann et al., J. Electrochem. Soc., Vol 131, No. 4, (1984).

It is further noted that spectrometers are well known in the art and typically comprise:

a. a means for receiving electromagnetic radiation;
b. a diffracting means;
c. a detector means.

In addition various reflective means can be included to direct entered electromagnetic radiation between entry point and detector. Many such spectrograph component patterns, (e.g. Czerny-Turner, Littrow, Bunsen, Monk-Gillieson, Ebert, Wadsworth, White Multiple Pass, Ebert-Fastie), are described in "Analytical Flame Spectroscopy", by Alkemade et al., Phillips Technical Library, Springer-Verlag, 11970). The Czerny-Turner system element configuration is identified as relevant as it is comprised of a diffracting means being positioned physically between a means for receiving electromagnetic radiation and a detector means on one side thereof, and first and second reflecting means on a second side thereof. In use electromagnetic radiation is caused to enter said means for receiving electromagnetic radiation and reflect from said first reflecting means, then interact with said diffracting means such that a diffracted spectrum of electromagnetic radiation is caused to reflect from said second reflecting means and enter said detector means. While Czerny-Turner spectrometers with first and second reflecting means which have focal lengths on the order of two-hundred-fifty t250) millimeters or more are known in the industry, similar spectrometers with focal lengths less than two-hundred-fifty (250) millimeters, (which can fit on a card which can be plugged into a computer slot), are typically subject to aberations entered into electromagnetic beams caused to enter thereto, because to fit physical components into the space available typically requires that electromagnetic beams be caused to approach first and second reflecting means at angles which are other than near normal, (and aberation effects become more pronounced where said incidence angle deviates from normal). Additionally, it is directly stated that no known Czerny-Turner type spectrometer, (particularly those with reflecting means that have focal lengths of less than two-hundred-fifty (250) millimeters), configure elements therein such that at least a part of detector means packaging is physically positioned in back of the grating present therein, (so that electromagnetic radiation reflecting from the second reflective means can not access said packaging), in order to allow an electromagnetic beam which is caused to enter into said Czerny-Turner type spectrometer to interact with the first and second reflective means at a near normal angle of incidence. This is particularly true where the first reflective means has a focal length which is less that that of the second reflective means.

Patents to Woollam et al. U.S. Pat. No. 5,373,359 and to Johns et al., U.S. Pat. No. 5,666,201, are disclosed as they are known and systems described therein include spectrometer systems. The 201 Patent describes an effective spectrometer system, in an ellipsometer setting, which spectrometer system intercepts and utilizes electromagnetic radiation present in multiple orders which arise from interaction with a grating dispersive means.

Continuing, while direct comparison of changes in spectrometer provided spectra, or individually selected wavelengths therein, over time, can provide first order insight as to when products of a silicon dioxide etch, for instance, is optimally complete, certain mathematical techniques are available which can increase detection sensitivity to etch end points. One such technique is termed "Principal Component Analysis" (PCA) and has as its basic focus the reduction of a large data set of correlated measurements to a smaller set of components which allow easier interpretation while retaining significant information content.

A very relevant mathematical technique which can be considered a subset of "Principal Component Analysis" (PCA), and which utilizes tracking of "Eigenvalues", is known as "Evolving Factor Analysis" (EFA). Generally, said technique provides that a Matrix be formed which can initially consist of a single row (column) of pixel values which correspond to intensity magnitudes of a spectrum of electromagnetic radiation at selected wavelengths, (typical practice is to utilize a sequence of wavelengths which are separated by fixed steps and which serve to provide data matrix pixil values). Said (EFA) technique then provides that a number of Eigenvalues be evaluated by Matrix manipulation. (The number of Eigenvalues selected is typically called the "Rank" of the Matrix and determination thereof is discussed more supra herein). This is followed by adding a second row of values which correspond to intensity magnitudes of a spectrum of electromagnetic radiation, typically at the same wavelengths as utilized in obtaining data for the first row (column), but at a progressed time. Then again, Eigenvalues are evaluated utilizing the expanded Matrix. This procedure is continued, and Plots of Eigenvalues so arrived at over a period of time, often show, in at least some of said Eigenvalue plots, observable, measurable, detectable relatively abrupt changes therein which correspond very closely to etch end points.

A paper which describes the Evolving Factor Analysis technique in more detail is titled, appropriately "Evolving Factor Analysis", and is authored by Keller and Massart. Said paper appeared in Chemometrics and Intelligent Laboratory Systems, 12 (1992) pp. 209–224 and is incorporated hereinto by reference. Said paper describes application to an evolving data set [x] which is present in Matrix form, and considers that said data set is to be decomposed into a Matrix of Column Factors [C(P×N)] and a Mattlx of Row Factors tA(N×Q)], where "N" is the number of Eigenvalues, (or Matrix Rank), to be tracked in time, and can correspond to the number of factors, (e.g. etch products), in a system being investigated. In addition, an Error or Noise Matrix [E(P×Q)], is also assumed to exist. In mathematical symbolism this can be represented as:

$$[X]=[C][A]+[E]$$

and more descriptively as:

$$[X] = \left[ P \underset{\downarrow}{\overset{N}{\longrightarrow}} \right] \left[ N \underset{\downarrow}{\overset{Q}{\longrightarrow}} \right] \left[ P \underset{\downarrow}{\overset{Q}{\longrightarrow}} \right]$$

The Keller et al. paper proceeds to state that the fundamental idea of (EFA) is to follow the change or evolution of the "Rank" of the Data Matrix Ox] as a function of "Ordered Variable". This is accomplished by a "Principal Component Analysis" on an increasing Data Matrix. Starting from a first Row of data, (which can be assumed to correspond to intensity magnitudes at selected wavelengths in a spectrum of wavelengths), the Eigenvalues are successively calculated for all Sub-Matrices $[X_i]$ which are formed by the first $i=1 \ldots P$ Rows, according to:

$$[X]=[S][L]+[E];$$

where [S(i×N)] is the scores Matrix and [L(N×N)] is the matrix of what is termed "loadings" by Keller et al. The primary and most important step in said procedure is described as the correct determination of the unknown number of Factors N. To do this all Q Eigenvectors of the Data Matrix are usually determined first, (i.e. the size of S is initially (i×Q) and that of L is (Q×Q)). For the first Sub-Matrix [$X_i$], which is built by the first Row of the Data, an Eigenvalue is calculated. A second Row of Data is then added and the process is repeated. This is continued until all Data Rows are present and Eigenvalues are calculated for the resulting progressively larger Matrices. Next, the various Eigenvalues (EV's), or more typically logarithms thereof (Log(EV's), are plotted against the Ordered Variable and continuous lines filled-in between discrete points for each Eigenvalue. Where said plots rise out of a Noise level, the Rank (N) is increased by One (1). The Keller et al. paper focused upon determining the presence of substances in a sample as made observable via use of, for example, chromatography/spectra, and the Rank, which, it is stated, is a direct indication of the number of substances present. In theory, the number of substances present is equal to the number of Eigenvalues, calculated as described, which rise above a Noise level in the plots of Eigenvalues vs. Ordered Variable.

Another paper by Keller & Massart, titled "Artifacts in Evolving Factor Analysis Based Methods For Purity Control In Liquid Chromatography, With Diode Array Detector", Anal. Chem. Acta, 263 (1992) is also identified for general purposes.

A variation on (EFA) is Evolving Windowed Factor Analysis (EWFA). The general approach is similar to that described for (EFA), but a constant dimension Data Matrix is utilized. That is, before any data processing is performed, some number of scans are obtained, which number is sufficient to fill all rows (columns) of a selected dimension Matrix. The evolving aspect of this approach is that as new scans are entered to an entry row (column) of said selected dimension Matrix, a previously entered row (column) is forced out the other side of the "Matrix Stack". The effect is that only the most recent scans are then represented in the Matrix. In addition, it is possible to modify the approach described by Keller et al. so that it is not Eigenvalues which are plotted, but rather members of a Diagonal Matrix [S] which when multiplied with another Matrix, constitutes an Eigenvalue Matrix. To elaborate, a Single Valued Decomposition (SVD) of a Data Matrix can be performed in which an Eigenvalue analysis of a non-square Matrix provides an Eigenvector ($V^T$) and two additional Matrices "U" and "S" which are related as:

$$X = USV^T,$$

where the product US is a Matrix of Eigenvalues of X, and where [S] is a Diagonal Matrix:

$$S = \begin{bmatrix} S_1 & 0 & 0 & 0 & 0 & 0 & 0 & 0 & \ldots \\ 0 & S_2 & 0 & 0 & 0 & 0 & 0 & 0 & \ldots \\ 0 & 0 & S_3 & 0 & 0 & 0 & 0 & 0 & \ldots \\ 0 & 0 & 0 & S_N & 0 & 0 & 0 & 0_M & \ldots \\ \ldots & \ldots & \ldots & \ldots & \ldots & \ldots & \ldots & \ldots \end{bmatrix}$$

(which Matrix, it is noted, need not be symmetrical. N is determined by the number of spectra in the matrix, and M by the number of pixils in each spectrum).

Practice of said Data Matrix Decomposition approach requires that after adding a new scan to a Data Matrix, (which pushes a previous value out the opposite side), Mathematical Decomposition of the resulting Data Matrix be performed with the result being that a new Diagonal Matrix [S] is formed. The values of the members of said Diagonal Matrix [S] can then be plotted as a function of time. Relatively abrupt changes in certain of said Diagonal Matrix [S] member plots can be indicative of such factors as application of Plasma forming energy, entry of etching gas, etching system perturbations, and, most importantly, etch end points. The present invention can utilize plots of Eigenvalues or members of said Diagonal Matrix [S], but it is noted that the latter has proven to provide convenient and fully satisfactory results. It is noted that a benefit of the (EWFA) approach is that the dimension of the Diagonal Matrix [S] is constant and is set by user selected Data Matrix Rank.

For general information, Decomposition of Data Matrices is described "Matrix Computations" by Golub & Van Loan, published by John Hopkins Press, 1989; and in "Solving Least Square Problems" by Lawson and Hanson, published by Prentice Hall in 1974; and in Handbook of Automatic Computations" by Wilkinson and Reinsch. Said references are all incorporated by reference hereinto.

An unpublished reference which describes the (EWFA) approach is a Ph.D. thesis to be presented by Michael Splichal at the University of New Mexico in 1996 titled "An Integrated System for Real-Time Feedback and Control of a Plasma Reactor Based upon Optical Emission Sensors and Chemometric Analysis". Said thesis is incorporated hereinto by reference.

The present invention is found in a specific application of a modified (EFWA) approach, preferably in conjunction with use of a unique present invention spectrometer design.

A search of Patents has turned-up very little in addition to the known spectrometer related 201 and 359 Patents already cited infra herein. However, a U.S. Pat. No. 5,658,423 to Angell et al. was identified and is disclosed as it refers to developing a model of the principal components of spectral data obtained during an etch procedure. Further, a Patent to Rietman et al., U.S. Pat. No. 5,654,903 is disclosed as describes a method and intelligent apparatus for use in real-time monitoring of plasma etch procedures. U.S. Pat. No. 5,644,503 to Ito et al. is disclosed as it describes a mathematical analysis procedure in which eigenvalues are calculated. A Patent to Gifford, U.S. Pat. No. 5,347,460 is disclosed as it describes a mathematical analysis procedure for application to optical emission spectrographic data in semiconductor fabrication. A Patent to DuFault et al. U.S. Pat. No. 4,721,114 is disclosed as it describes a mathematical technique, albeit applied in cardiographic detection of P-Waves in ECG recordings. A U.S. Pat. No. 5,655,540 to Seegobin is also identified as it describes, in an ECG setting, use of an error reducing mathematical technique in which a normal data set is formed by averaging normal population data, and a subject data set is similarly determined and mean and standard deviation therefore are calculated for both data sets, and compared to provide results, in error reducing manners. This is mentioned as the present invention can utilize a similar approach wherein, on a per pixel basis, actual obtained etch end point data can have a corresponding mean "normal" data set value subtracted therefrom, with said result of said subtraction being divided by the corresponding "normal" data set standard deviation. The result can be utilized as a reduced data matrix to which is applied EWFA techniques to provide Diagonal factors [s]. This is an optional step which has been shown to remove false endpoint indications in some cases.

A known Patent to Welch, U.S. Pat. No. 5,663,584, is also disclosed as it describes use of a plasma silicon dioxide etching procedure applied in fabrication of Schottky barrier based (MOS) devices, including inverting and non-inverting single devices which operate similar to multiple device Complimentary Metal Oxide Semiconductor Field Effect Transistor (CMOS) Systems.

As alluded to, the present invention has primary application in the area of detecting etch end points. And as will be described in the remaining Sections of this Disclosure, the method of Evolving Windowed Factor Analysis (EWFA), preferably as applied to emissive intensity spectra obtained utilizing a present invention spectrometer system, is preferably utilized in the present invention. As will become apparent, however, other spectrometer systems can be used in certain embodiments, and certain operational speed enhancement attributes of said present invention method, which are not disclosed or suggested by any reference known to the Inventors herein, serve to make the present invention particularly applicable to use in Real Time.

DISCLOSURE OF THE INVENTION

The present invention can be beneficially observed from three major viewpoints.

First, the present invention provides a spectrometer system which provides novel relative positioning of components therein.

Second, said present invention spectrometer system can be considered as utilized in combination with a method of multifactor analysis in both real time and as applied in retrospect to obtained stored data.

Third, said present invention can be considered to comprise application of a unique, high efficiency, high speed, "Multifactor" Evolving Windowed Factor Analysis (EWFA) method to determine semiconductor etch end points in real time, thereby enabling not only semiconductor fabrication process monitoring, but also process control.

In more detail, the present invention spectrometer system sequentially comprises:
  a. at least one means for receiving electromagnetic radiation;
  b. a first reflecting means with a focal length less than two-hundred-fifty (250) millimeters; at least one diffracting means;
  c. at least one diffracting means;
  d. a second reflecting means with a focal length less than two-hundred-fifty (250) millimeters; and
  e. at least one detector means consisting of centrally located active detectors and laterally disposed packaging;

said diffracting means being mounted on a stage, (preferably rotatable), which is positioned physically between said means for receiving electromagnetic radiation and said detector means on one side thereof, and said first and second reflecting means on a second side thereof; such that, in use, electromagnetic radiation is caused to enter said means for receiving electromagnetic radiation and reflect from said first reflecting means, then interact with said diffracting means such that a diffracted spectrum of electromagnetic radiation is caused to reflect from said second reflecting means and enter said detector means, in which spectrometer system the first reflecting means has a focal length which is less than that of said second reflecting means and in which spectrometer system at least part of the detector means laterally disposed packaging is positioned behind said diffracting means in the sense that electromagnetic radiation reflecting from said second reflecting means is blocked direct access thereto by said diffracting means. It should be appreciated that positioning said detector means laterally disposed packaging behind the diffracting means allows positioning the active detectors laterally very near the grating, which is not possible if the detector means laterally disposed packaging is positioned laterally adjacent to the diffracting means. All known spectrometer systems which comprise reflecting means with a focal length less than two-hundred-fifty (250) millimeters position detector means laterally disposed with respect to the diffracting means and thus require that entering electromagnetic radiation interact with reflecting means therein at angles of incidence which significantly deviate from normal. As a nonlimiting example, the focal length of said first reflecting means can be in the range of fifty-eight (58) to sixty-two (62), (nominal (60)), millimeters, and the focal length of said second reflecting means can be in the range of seventy (70) to eighty (80), (nominal (75)), millimeters. However a focal length of said first reflecting means in the range of fifty (50) to one-hundred-twenty (120) millimeters, and a focal length of said second reflecting means in the range of sixty (60) to one-hundred-sixty (160) millimeters is well within the scope of the present invention.

It is further noted that said spectrometer system means for receiving electromagnetic radiation can comprise a slit with dimensions of between five (5) to thirty (30) microns by one-hundred (100) to two-thousand (2000) microns, with nominal values of seventeen (17) by one-thousand (1000) microns. Further, said means for receiving electromagnetic radiation can comprise a means for accepting a fiber optic.

In addition said spectrometer system typically further comprises a printed circuit board with plug means for effecting electrical contact to an expansion slot in a computer system, said spectrometer system being mounted to said printed circuit board via vibration absorbing and stress relieving means such as compliant rubber spacers.

Said spectrometer system detector means can comprise electrical contact pins suitable for mounting to integrated circuit sockets and to printed circuit boards, Said detector means is, however, preferably mounted by other than physical interconnection to said electrical contact pins, with said electrical contact pins being electrically accessed via stress relieving flexible means. And said spectrometer system can further comprise a computing means to which said detector means is electrically interconnected, such that in use signal (s) corresponding to detected electromagnetic radiation is/are input to said computing means by said detector means.

Said spectrometer system can further comprise a filter means placed prior to said detector means. Said filter means -can be comprised of at least one element which provides utility by serving to separate out the wavelengths of other than a first order produced by interaction of said electromagnetic radiation with said diffraction means, from wavelengths of a first order and allow only wavelengths of said first order to enter said detector means, or by serving to selectively attenuate certain high intensity signals. With respect to the later point, it can happen that a relatively large magnitude intensity peak is present at a certain wavelength in a spectrum of electromagnetic wavelengths. Where this is the case, to measure said large magnitude intensity can require that sensitivity of a measuring detector system be set such that lesser magnitude intensities are not measurable. Selectively attenuating said relatively large magnitude intensity can then enable simultaneous measurement of it, and said lesser magnitude intensities. Of course, the attenuation factor will typically be mathematically factored back in to provide accurate end result measurement of said relatively large magnitude intensity.

It is also noted that a preferred spectrometer system diffraction means is a grating, and that said detector means is preferably selected from the group consisting of charge coupled devices, charge injection devices, and photo diode arrays.

While better understood by reference to the Drawings, it is noted for emphasis, at this point, that the present invention spectrometer system positions the mirrors and grating therein so that an electromagnetic beam approaches them at very near to a normal angle of incidence. This is extremely important because the closer to a normal angle of incidence a beam of electromagnetic radiation makes to, for instance, a mirror, the less significant are aberration effects induced by said mirror, in a reflected beam of electromagnetic radiation. The importance of avoiding the aberration entering effects of mirrors in a spectrometer system is of critical importance where optimum wavelength resolving power is desired. For example, application of the present invention has specifically shown that resolution of wavelengths which, vary from one another by one to two tenths of a nanometer (1/10–2/10 nm) or so can be critical to precise detection of etch endpoints. For instance, it is the case that where said resolution is not possible, a detector might provide an output of "X"="Y+Z", where "Y" and "Z" are output "X" constituents contributed by different wavelengths. It can happen that at an etch end point one of the constituents "Y" and "Z" can increase and another decrease, providing a relatively constant value for "X". That is, an increased intensity in one component is offset by a decreased intensity in the other, leaving the resulting detector output "X" essentially constant. If, however, resolution of "Y" and "Z" can be achieved, and separate detector signals developed for each, then evidence of an end etch point is made much more evident. Again, the present invention spectrometer system positions the grating and mirrors present therein so that a beam of electromagnetic radiation interacting therewith in use, approaches the mirrors at closer to a normal angle of incidence than have previous compact spectrometer systems, and this enables provides greater wavelength resolving capability. The present spectrometer design enables greater etch end point sensitivity by providing better data for evolving windowed factor analysis. As better described supra herein, the changes in members of a diagonal matrix [S] or eigenvalues [US] of a data matrix=[X]=[U][S][$V^T$], plotted against time, become sharper and are better indications of etch end points, where spectrometer provided data is of better quality, and greater spectrometer wavelength resolution capability interprets to higher quality data.

When combined with means for etching semiconductor substrates, said present invention spectrometer system can be considered to be a semiconductor etch end-point detecting system. It is noted that systems for etching semiconductor substrates typically comprise means for effecting plasma etching and consist of:

a. at least one vacuum chamber in which a semiconductor system to be etched is present during use;

b. at least one means for entering etching gas to said vacuum chamber;

c. at least one means for applying electrical energy to said etching gas;

d. at least one means for accessing electromagnetic radiation present in said vacuum chamber during a semiconductor etching process; and e. at least one means for guiding said accessed electromagnetic radiation into said spectrometer system means for receiving a electromagnetic radiation.

(it is noted that typical commercial plasma etching systems are available from manufacturers such as Applied Materials (AMAT), LAM Research and Tokyo Electron (TEL)).

With the mayor aspects of the System of the present invention now described, attention is turned to various aspects of Method.

In its most basic sense, the method of the present invention involves identifying semiconductor etch end points in both real time, and in retrospect. One embodiment, which relies upon use of the present invention system described infra herein, comprises the step of:

A. providing a semiconductor etch end-point detecting system as described infra, and then chronologically repeatedly performing steps B. through F. in an evolving windowed factor analysis sequence until detecting semiconductor etch end point, said steps B. through F. being:

B. during a semiconductor etch procedure in a vacuum chamber of said system, obtaining a chronological sequence of electromagnetic radiation intensity vs. wavelength spectra from said spectrometer system detector means, said spectrometer system detector means being caused to access electromagnetic radiation present in said vacuum chamber during a semiconductor etching process;

C. selecting some number of electromagnetic radiation intensity vs. wavelength spectra from said chronological sequence of electromagnetic radiation intensity vs. wavelength spectra and forming them into a data matrix;

D. optionally selecting and deleting some set-off number of rows (columns) in said data matrix, typically other than first and last rows (columns);

E. by applying mathematical matrix decomposition techniques to said data matrix determining value(s) of at least one representative parameter(s), each said representative parameter(s) being selected from the group consisting of: (members of a diagonal matrix [S] and eigenvalues [US] where:

Data Matrix=[X]=[U][S][$V^T$]);

F. detecting semiconductor etch end point based upon change in said repeatedly calculated at least one representative parameter value(s) resulting from said chronologically repeated performance of steps B. through F.

Said method of identifying semiconductor etch end points can further comprise at least one step selected from the group consisting of:

a. in conjunction with said step B. obtaining of a chronological sequence of electromagnetic radiation intensity vs. wavelength spectra from said detector means, the performing signal to noise ratio enhancing technique(s), such that said each of said electromagnetic radiation intensity vs. wavelength spectra in said chronological sequence thereof utilized to form said data matrix in step C. are composite electromagnetic radiation intensity vs. wavelength spectra with improved signal to noise ratios; and b. in conjunction with said step C. the step of identifying critical wavelengths and deleting intensity values at other wavelengths in said spectra.

The most important application of the method of the present invention provides for identifying semiconductor etch end points in real time and can comprise chronologically repeatedly performing steps a. through f. in an evolving windowed factor analysis sequence until detecting semiconductor etch end point, said steps a. through f. being:
  a. while performing a semiconductor etch procedure in a vacuum chamber, obtaining a chronological sequence of electromagnetic radiation intensity vs. wavelength spectra from a detector means, said detector means being positioned so as to receive electromagnetic radiation eminating from said vacuum chamber during said semiconductor etch procedure;
  b. selecting a period of time and for each of a sequence of said selected time periods performing signal to noise ratio enhancing technique(s) to two or more electromagnetic radiation intensity vs. wavelength spectra obtained thereduring, with the result being a chronological sequence of composite spectra with improved signal to noise ratios;
  c. selecting some number of composite spectra in said chronological sequence of composite spectra, and forming them into a data matrix consisting of a definite number of rows and columns;
  d. optionally selecting and deleting some set-off number of rows (columns) in said data matrix;
  e. by mathematical matrix decomposition techniques determining values for at least one representative parameter(s) selected from the group consisting of: (members of a diagonal matrix [S] and eigenvalues [US]), where Data Matrix=$[X]=[U][S][V^T]$);

which representative parameter(s) monitor changes in said chronological sequence of composite spectra;
  f. detecting semiconductor etch end point based upon change in said repeatedly calculated at least one representative parameter value(s) resulting from said chronologically repeated performance of steps a. through f.

Said method of identifying semiconductor etch end points in real time can further comprise the step of identifying critical wavelengths and deleting intensity values at other wavelengths in said composite spectra.

A somewhat different presentation of the present invention method of identifying semiconductor etch end points in real time comprises chronologically repeatedly performing steps a. through e. in an evolving windowed factor analysis sequence until detecting semiconductor etch end point, said steps a. through e. being:
  a. while performing a semiconductor etch procedure in a vacuum chamber, obtaining a chronological sequence of electromagnetic radiation intensity vs. wavelength spectra from a detector means, said detector means being positioned so as to receive electromagnetic radiation eminating from said vacuum chamber during said semiconductor etch procedure;
  b. selecting some number of electromagnetic radiation intensity vs. wavelengths spectra in said chronological sequence of electromagnetic radiation intensity vs. wavelengths spectra, and forming them into a data matrix consisting of a definite number of rows and columns;
  c. selecting and deleting some set-off number of rows (columns) in said data matrix;
  d. by mathematical matrix decomposition techniques determining values for at least one representative parameter(s) selected from the group consisting of: (members of a diagonal matrix [S] and eigenvalues [US]), where Data Matrix=$[X]=[U][S][V^T]$);

which representative parameter(s) monitor changes in said chronological sequence of electromagnetic radiation intensity vs. wavelength spectra;
  e. detecting semiconductor etch end point based upon change in said repeatedly calculated at least one representative parameter value(s) resulting from said chronologically repeated performance of steps a. through e.

Said present invention method of identifying semiconductor etch end points in real time can further comprise at least one step selected from the group consisting of:
  a. in conjunction with said step b. obtaining of a chronological sequence of electromagnetic radiation intensity vs. wavelength spectra from said detector means, the performing signal to noise ratio enhancing technique(s), such that said each of said electromagnetic radiation intensity vs. wavelength spectra in said chronological sequence thereof utilized to form said data matrix are composite electromagnetic radiation intensity vs. wavelength spectra with improved signal to noise ratios; and
  b. identifying critical wavelengths and deleting intensity values at other wavelengths in said obtained electromagnetic radiation intensity vs. wavelength spectra.

With the foregoing in mind, it is further noted that plasma etching systems often operate with a "rotating plasma" basis in which the position of the center of a plasma within an etching system varies during use. This variation is typically essentially cyclical around an effective central point in a plasma etching system, with a period on the order of two (2) to three (3) seconds. As a result, the intensity of Electromagnetic radiation detected by an essentially stationary position detector typically varies during an etching procedure in a cyclic manner with the same period, (e.g. on the order of two (2) to three (3) seconds), as the "rotating plasma". Further, it is noted that known signal integrating electromagnetic wave detector systems can serve to process varying signals and provide a "smoothed" output. However, signal integrating electromagnetic wave detector systems, being biased by a finite voltage power source, demonstrate saturation effects where too long an integration period is selected. A preferred embodiment of the present invention recognizes both of these well known facts, and, to improve etch end point detection capability, provides that in a preferred embodiment a detector system integrate signals input thereto during an etching procedure over a series of time periods which are each a fraction, (eg. ½, ⅓, ¼, ⅛ etc.), of the plasma rotation period. This is combined with the addition of the results of said integrations obtained during a single plasma rotation period to provide a "per plasma rotation period" output signal. In practice, the plasma rotation period is empirically determined, and the fraction of the plasma rotation period selected as an integration period is determined so as to avoid integration circuitry saturation effects, while still providing a measurable output signal in a range which is on the order of fifty (50%) to eighty (80%) percent of the integration circuitry saturation value. The described procedure has been found to improve the signal to noise ratio of the present invention, particularly where combined with elimination of wavelengths from a spectrum which are empirically observed to be "noisy", (ie. somewhat unpredictably vary over time).

It is also noted that certain groupings of wavelengths are particularly well suited to detection of etching end points of specific materials. This is because the plasma etching products vary with the substrate etched. For instance, where Silicon Dioxide ($SiO_2$) is etched, the products include Si, SiF and $SiF_2$, but where Silicon Nitride is etched, the products include SiN. Electromagnetic wavelengths emitted by different etch products are, of course, different. The present invention includes the use of Wavelength "Mask" which pass relevant sets of wavelengths to a detector, and not others. This result can be achieved by digital filtering techniques, for instance.

Further, while the experimental work supporting this invention has focused on application to etch end point detection, it is to be understood that the spectrometer and mathematical techniques are applicable to any procedure which provides varying content electromagnetic radiation at an input to said spectrometer system. For instance, plasma cleaning of a process chamber can be similarly monitored.

The present invention will be better understood by reference to the Detailed Description Section of this Disclosure, in conjunction with the accompanying Drawings.

SUMMARY OF THE INVENTION

It is therefore a purpose of the present invention to teach a spectrometer system which provides novel relative positioning of components therein.

It is another purpose of the present invention to teach utilization of said present invention spectrometer system in combination with a multifactor analysis method in both real time and as applied in retrospect to obtained stored data to enable detection of semiconductor etch end points.

It is yet another purpose of the present invention to teach a multifactor analysis method which can, in real time, be applied to determine semiconductor etch end points, and thereby enable semiconductor fabrication process control, said multifactor analysis method being characterized by selections from the group consisting of the use of bifrucated window matracies, and the use of mask selection of wavelength sets, and the compensation of plasma rotation effects by use of a fractional integration period combined with a full period representing results summation procedure.

BRIEF DESCRIPTION OF THE DRAWINGS

FIG. 1a1 shows relative positioning of present invention spectrometer system components on a printed circuit board with pins appropriate for mounting to an expansion board slot of a computer system.

FIG. 1a2 shows a variation of the FIG. 1a1 relative positioning of present invention spectrometer system components on a printed circuit board with pins appropriate for mounting to an expansion board slot of a computer system.

FIG. 2 shows a demonstrative vacuum chamber and semiconductor substrate placed therein for plasma etching.

FIG. 4 shows a flow diagram for the method of the present invention which is applicable in real time monitoring of semiconductor etch end points.

FIG. 5a1 shows a present invention evolving windowed factor analysis data matrix consisting of discrete factors.

FIG. 5a2 shows a present invention evolving windowed factor analysis data matrix consisting of a demonstrative continuous spectra.

DETAILED DESCRIPTION

Turning now to FIG. 1a1 there is shown a top view of the layout of the present invention spectrometer system (SPEC). Said spectrometer system (SPEC) sequentially comprises:

a. a means for receiving electromagnetic radiation (COUP);

b. a first reflecting means (M1);

c. a diffracting means (GRT);

d. a second reflecting means (M2); and e. a detector means (DET).

Said diffracting means (GRT) is shown as present on a stage (STG), which is preferably rotatable to allow easy adjustment, and is positioned physically essentially between said detector means (DET) on one side thereof, and said first (M1) and second (M2) reflecting means on a second side thereof. Said means for receiving electromagnetic radiation (COUP) is shown as on the same side of the diffracting means (GRT) and this constitutes the preferred, but not limiting, embodiment. In use, it can be seen, electromagnetic radiation is caused to enter said means for receiving electromagnetic radiation (COUP) via a light fiber (LF), and reflect from said first reflecting means (M1), then interact with said diffracting means (GRT) such that a diffracted spectrum of electromagnetic radiation is caused to reflect from said second reflecting means (M2) and enter said detector means (DET). To the Inventor's knowledge, no other spectrometer system places a diffracting means (GRT) physically as shown with respect to other identified elements of the present invention spectrometer system. It is emphasized that this configuration provides great utility because available detector (DET) systems physically have inactive regions at left and right extents thereof. As shown by FIG. 1a1, an inactive region at the left of the detector (DET) can be positioned "behind" (as viewed by an electromagnetic beam reflecting from a reflecting means), the grating (GRT). The lateral compactness enabled by the present invention element configuration also allows greater wavelength resolution to be achieved thereby in use as aberrations entered to an electromagnetic beam which reflects from a reflecting means (M1) (M2) become smaller as the angle of incidence approaches a normal to the reflecting means surface of a reflecting means (M1) (M2), at the position of electromagnetic beam interaction therewith. Also shown in FIG. 1a1, is a printed circuit board (PCC) with connector (PLUG) appropriate for plugging into an expansion slot in a computer system, to which circuit board (PCC) said spectrometer system (SPEC) is mounted. It is noted that said mounting is typically mediated by vibration absorbing and stress relieving means, such as rubber legs.

Figure 1B:
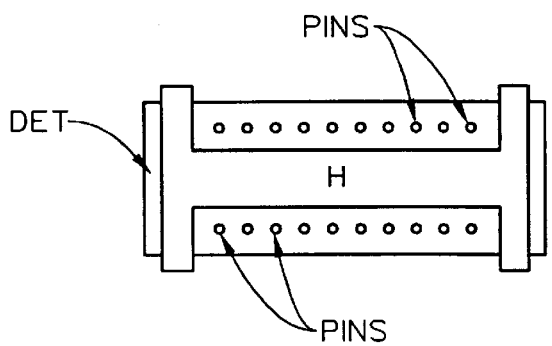
FIG. 1b shows a detector means mounted by other than physical interconnection to electrical contact pins, such that said electrical contact pins can be electrically accessed via stress relieving flexible means. Said detector means can be a charge coupled device, a charge injection device, or a photo diode array etc.
Figure 1C:
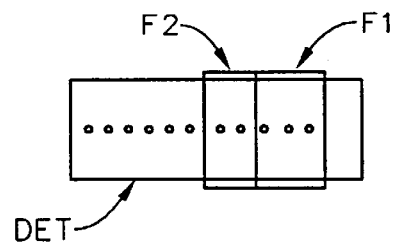
FIG. 1c shows filter means placed prior to said detector means.
Figure 2:
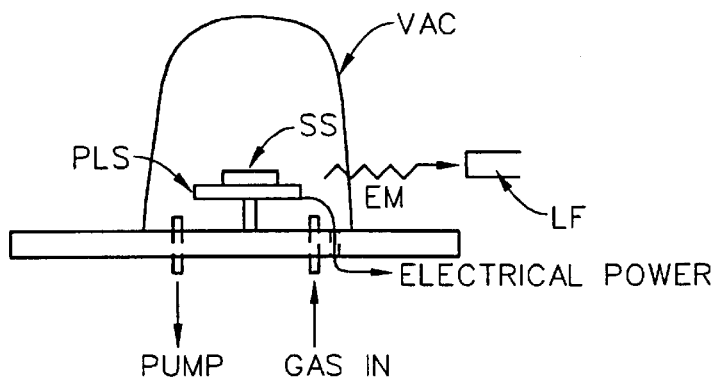

FIG. 1a2 shows a variation of the FIG. 1a1, relative positioning of present invention spectrometer system components on a printed circuit board with pins appropriate for mounting to an expansion board slot of a computer system. It has been determined that the FIG. 1a1, version, wherein the diffracting means (GRT) is oriented as shown so as to direct a Positive First Order Spectrum into the Detector (DET) System, a "red wavelength blotch", appears at Detector (DET) Pixels centrally located therewithin. FIG. 1a2 shows that the diffracting means (GRT) is rotated in orientation as compared to that in FIG. 1a1, so as to direct a Negative First Order Spectrum into the Detector (DET) System. Accompanying this rotated reorientation of the diffracting means (GRT), the diffraction grating (GRT) itself is restructured to include an appropriate blazing angle configuration to divert electromagnetic energy from the Zeroth Order and into the detector (DET) intercepted Negative First Order. (See U.S. Pat. No. 5,666,201 to Johns et al. for a discussion of various Orders in a beam of electromagnetic radiation reflected from a grating (GRT) which has a blazing angle incorporated therewithin). Generally, is is noted that the blazing of the Grating in a FIG. 1a1, configuration, which shifts electromagnetic radiation energy from a Zeroth Order into a Positive First Order, is reversed so that electromagnetic radiation energy is shifted primarily from a Zeroth Order into a Negative First Order. The end result of utilizing the Negative First Order is that the electromagnetic radiation which caused the "red wavelength blotch" to appear at centrally located Detector (DET) Pixels in a FIG. 1a1, configuration, is directed away from the Detector (DET) in the FIG. 1a2 configuration. It is noted that in the Scientific literature discussion of diffraction etc. is found under the topic of "Newtonian Mirrors".

With regard to FIG. 1a2, but applicable also to FIG. 1a1, it is also noted that more recent practice has favored extension of the length dimension of the entire present invention spectrometer system (SPEC), so that Focal Lengths for Mirror (M1) can be on the nominal order of one-hundred (100), rather than sixty (60) millimeters; and focal lengths of mirror (M2) can be on the order of one-hundred-twenty-five (125) rather than seventy-five (75) millimeters. This, it should be appreciated, provides additional benefits in that electromagnetic beams interacting with Mirrors (M1) and (M2), and the Grating (GRT), therein do so at an angle closer to the "normal" to the surface thereof at the point of interaction. And, as alluded to at other places in this Disclosure, the closer to a "normal" to a surface of a mirror or grating that a beam of electromagnetic radiation approaches said mirror or grating, the less aberration is entered to the reflected beam by said interaction. It is also disclosed that approximate overall dimensions of the present invention spectrometer system as viewed from above, are from nine (9) to thirteen (13) inches long, by four (4) to five (5) inches wide, with mounted components projecting approximately one (1.0) inch perpendicularly.

As better shown in FIG. 1b, the detector (DET) mounting in the spectrometer system (SPEC) is preferably via a bracket (H) which typically is glued to the detector system. This is in lieu of effecting physical attachment via electrical (PINS), such as is typical in printed circuit board applications. This approach to mounting prevents stresses in the detector means (DET), and allows electrical connection via flexible connection means (not shown).

FIG. 1c shows that filter means (F1) and/or (F2) can be present. Said filter means (F1) and/or (F2) placed prior to said detector means is comprised of at least one element(s) which provide utility selected from the group consisting of:

a. serving to separate out the wavelengths of other than a first order produced by interaction of said electromagnetic radiation with said diffraction means, from wavelengths of a first order and allow only wavelengths of said first order to enter said detector means, (filter means (F1); and b. serving to selectively attenuate certain high intensity signals, (e.g. 516 nanometers via (filter means (F2)).

Figure 1D:
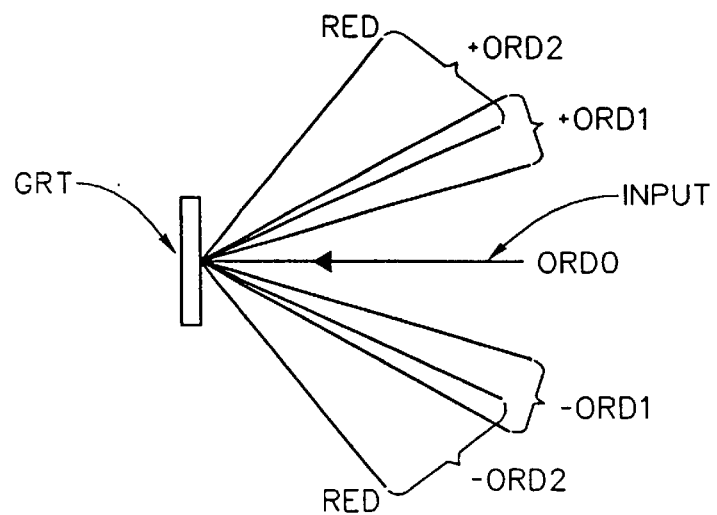
FIG. 1d shows the relationship between "$0^{th}$", (+/–"$1^{st}$" and (+/–0,$2^{nd}$") "Orders" which diffract from a Grating.

FIG. 1d shows the relationship between "$0^{th}$" Order (ORDO), (+/−"$1^{st}$") Order (+ORD1) (−ORD1), and (+/−"$2^{nd}$") (+ORD2) (−ORD2) Order which diffract from a Grating.

Figure 1E:
FIGS. 1e and 1f show a Grating in two orientations which serve to shift "$0^{th}$" Order spectral energy predominately into + or –"$1^{st}$" Orders, respectively.
Figure 1F:

FIGS. 1e and 1f show a Grating with a Blazing Angle (BA), said Grating being in two orientations which serve to shift "$0^{th}$" Order spectral energy predominately into "plus" (+) or minus (−) "$1^{st}$") Orders, respectively. The Grating in FIG. 1d for instance, is applied in FIG. 1a1, and the Grating in FIG. 1e. for instance, is applied in FIG. 1a2 such that in the configuration of FIG. 1a1, the positive (+"$1^{st}$") Order is passed to mirror M2, while in the configuration of FIG. 1a2 negative (−"$1^{st}$") Order is passed to mirror M2. As described infra herein, the configuration of FIG. 1a2 is preferred.

Also shown on FIGS. 1a1, and 1a2 are indications of reversed (+"$1^{st}$") and (−"$1^{st}$") Order positions of Green (G) and Ultraviolet (UV) wavelength interception by the Detector (DET).

FIG. 2 shows in a general sense a non-limiting representation of a system for etching semiconductor substrates further comprises, as said means for effecting plasma etching of semiconductor:

a. a vacuum chamber (VAC) in which a semiconductor system (SS) to be etched is present during use;

b. a means for entering etching gas (GAS IN) to said vacuum chamber (VAC);

c. a means for applying electrical energy (PLS) to said etching gas; and d. a means for accessing electromagnetic radiation (EM) present in said vacuum chamber (VAC) during a semiconductor etching process; and e. a means for guiding (LF) said accessed electromagnetic radiation (EM) into said spectrometer system (SPEC) means for receiving electromagnetic radiation (COUP).

(It is noted that use of the terminology "a" herein generally does not imply that more than one such element can not be present).

Figure 3:
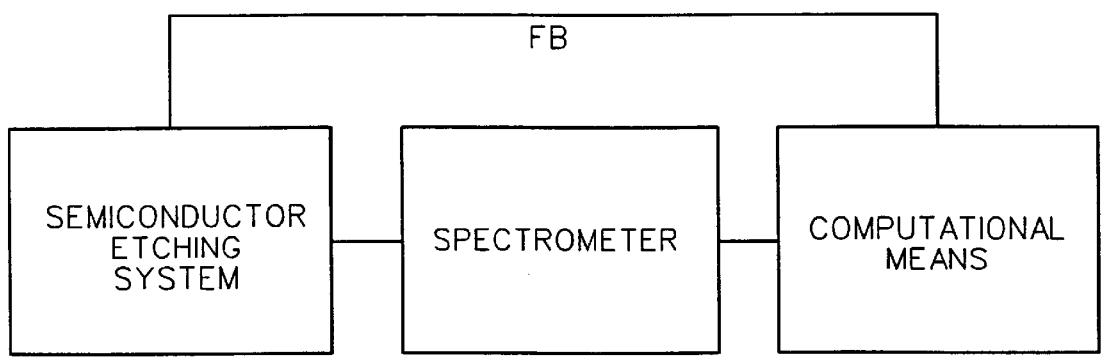
FIG. 3 shows, in block diagram form, a semiconductor etch end-point detecting system.

Continuing, FIG. 3 shows a block diagram of the present invention showing that a system for etching semiconductor serves to provide electromagnetic spectra which enter a spectrometer system. Output from said spectrometer system is entered to a computational means. Also shown is a feedback (FB) path by which computed etch end point control can be applied to the semiconductor etching system.

FIG. 4 provides a bit more detail and shows that the present invention method requires the providing of a semiconductor etch end-point detecting system comprising a vacuum chamber and a spectrometer system in step (A). This is followed by repeatedly performing steps (B) through (E) in a chronological evolving windowed factor analysis sequence until detecting semiconductor etch end point. Step B. provides that during a semiconductor etch procedure in said vacuum chamber, chronological sequence of electromagnetic radiation intensity vs. wavelength spectra be obtained from a spectrometer system detector means. Optionally signal to noise ratio enhancing technique(s) can be applied to said obtained spectra and, also optionally critical wavelengths can be identified and intensity values at other wavelengths in said spectra deleted. Step (C) involves selecting some number of electromagnetic radiation intensity vs. wavelength spectra from said chronological sequence of electromagnetic radiation intensity vs. wavelength spectra and forming them into a data matrix, and optionally deleting rows or columns from said data matrix. In step (D) mathematical matrix decomposition techniques are applied to said data matrix to determine value(s) of at least one representative parameter(s), each said representative parameter(s) being selected from the group consisting of: (members of a diagonal matrix and eigenvalues). Finally, step (E) involves detecting semiconductor etch end point based upon change in said repeatedly calculated at least one representative parameter value(s) resulting from said chronologically repeated performance of steps B. through F.

Figure 5B:
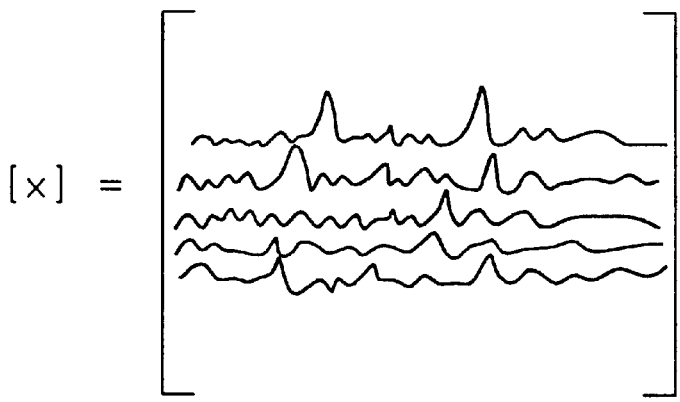
FIG. 5b shows a present invention evolving windowed factor analysis data matrix with selected column data deleted to allow faster real time application.

FIG. 5a1 shows a demonstrative non-limiting (5×5) data matrix of discrete factor elements (a1–e5). FIG. 5b shows the demonstrative (5×5) data matrix of FIG. 5a wherein additional columns are present, but wherein the third column has been deleted. In effect, a Bifrucated Window is formed. Both FIGS. 5a1 and 5b show (5×5) matrices, but in FIG. 5b a larger set of data is first obtained. It would be possible to delete additional column(s) (e.g. the forth column), and work with a further reduced dimension matrix. (It is also to be understood that the FIG. 5a1 matrix need not be square dimension, that is it could be (5×X) dimension, where X is greater than 5). In fact, typical practice of the present invention utilizes a non-square matrix). Said approach to data handling provides increased speed while allowing comparison of data separated by more time than are data in adjacent columns. As far as is known, this is a modification to conventional Evolving Windowed Factor Analysis (EWFA) which is unique to the present invention method, and it is emphasized that the increased speed enabled by said reduced data handing technique allows extension to real time applications where delays required to perform long calculations, even in fast computer systems, can be prohibitive. In addition, it is to be understood that each (column) of a data matrix as shown in FIGS. 5a1 and 5b consist of intensity representing pixel values for a digitized sequence of electromagnetic radiation intensity vs. wavelength spectra provided by a spectrometer system. Further, in practice it is possible to apply signal to noise ratio enhancing techniques to multiple such electromagnetic radiation intensity vs. wavelength spectra, (such as averaging), so that each row (column) of a data matrix represents a composite of a number of electromagnetic radiation intensity vs. wavelength spectra. In the context of known Evolving Windowed Factor Analysis (EWFA), this improving of signal to noise ratio is again is thought to be unique to the present invention method. FIG. 5a2 demonstrates that the data Matrix of FIG. 5a1 is a discrete form of an chronological sequence of electromagnetic radiation intensity vs. wavelength spectra. As the number of elements of a FIG. 5a1 data Matrix increases, said FIG. 5a1 data Matrix more closely represents a FIG. 5a2 spectrum. For insight, it is noted that a typical number of FIG. 5a1 elements would be two-thousand per electromagnetic radiation intensity vs. wavelength spectra.

Figure 6:
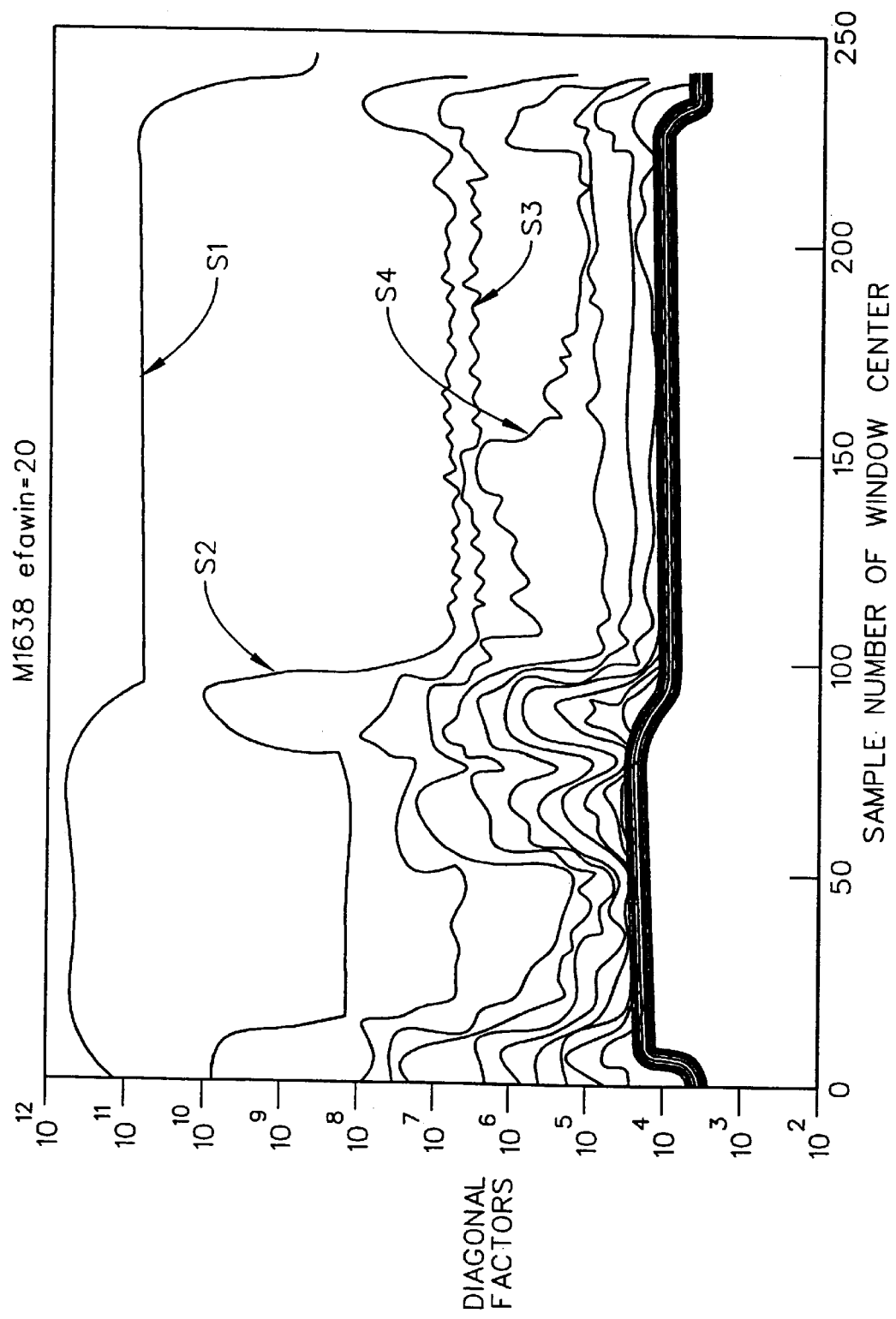
FIG. 6 show a plot of representative parameters calculated by the method of the present invention.

FIG. 6 shows actual data acquired during plasma etching of silicon dioxide. Note that Diagonal [S] Matrix factors, (see Disclosure of the Invention Section), indicate various effects. Diagonal factor [S1] shows, between window points zero (0.0) to one-hundred (100) the application of the plasma. Diagonal [S2] identifies semiconductor substrate cleaning start and stop between similar window points. Diagonal factor [S3] shows the start of oxide etching at Channel approximately one-hundred (100), and Diagonal factor [S4] shows end of etch at approximately channel number one-hundred-sixty (160).

It is noted that in practice, sample "training etches" can be performed to determine the appearance of Diagonal factors [S] Pixels in electromagnetic spectra can be identified which have the greatest effect on "end-point" Diagonal factor, e.g. [S3] variance, and their use focused upon in real-time procedures. As well, a data matrix can be formed by utilizing averaged sample "training etch" test data as a "normal" data set. Mean and standard deviation therefore can be calculated for such a "normal" data set, and in use, on a per pixel basis, actual obtained etch end point data can have said corresponding mean "normal" data set value subtracted therefrom, with said result of said subtraction being divided by the corresponding "normal" data set standard deviation. The result can be utilized as a reduced data matrix to which is applied (EWFA) techniques to provide Diagonal factors [S]. This is an optional step which has been shown to remove false end-point indications in some cases. It is noted that a similar approach to data handling is taught with regard to application in analysis of cardiac ECG tracings, in U.S. Pat. No. 5,655,540 to Seegobin. The present invention is then primarily found in:

the design of a spectrometer system which enables superior resolution data acquisition;

the application of the technique of evolving windowed factor analysis to etch end point detection; and the application of mathematical analysis techniques such as the selecting of some number of reduced electromagnetic radiation intensity vs. wavelengths spectra in a chronological sequence of electromagnetic radiation intensity vs. wavelengths spectra; and/or in the forming of a data matrix consisting of a definite number of rows and columns with bifrucated window forming selection and deletion of some set-off number of rows (columns) in said data matrix prior to performing mathematical matrix decomposition on said data matrix to determine value(s) of at least one representative parameter(s), each said representative parameter(s) being selected from the group consisting of: (members of a diagonal matrix and eigenvalues), and in a period specific signal integration and averaging approach to compensation of the plasma rotation effects by mathematical analysis techniques. It is specifically noted that the technique of windowed factor analysis per se. is not a basis of Patentability, nor is the simple recognition of the fact that plasma rotation occurs and can affect detected signals. It is rather the method of application and method of overcoming, respectively, said topics which are inventive. It is also noted that signals from other than a described electromagnetic wave monitoring spectrometer system, (e.g. such as from an etch end point monitoring mass spectrometer system), can be input to the described evolving windowed factor analysis to etch end point detection, and be within the scope of the present invention.

It is further disclosed that the preferred light fiber (LF) is commonly available multimode silica-core suitable for transmitting ultraviolet wavelengths below 350 nm. The Coupler (COUP) is a standard optical tubular element which accepts said light fiber. Preferred practice places a stray light stopping Field Stop Aperature following said coupler, which Aperature has a slit width of from 5 to 600 microns and a height of 1 mm. Mirror (M1) preferably has a unity aspect and a Focal length of 4.1 or 7.4, and Mirror (M2) has an aspect ratio of 2.5/1 and a Focal length of 5.4 or 7.3, respectively. The Grating (GRT) is a Reflective Diffraction Plane Grating, (e.g. nominal 600 grooves/mm and a blazing angle of 5 Degrees), and can be obtained from Richardson Grating Labs. The Detector (DET) is preferably a linear CCD such as available from Sony Corporation, which, it is noted provides that an active region thereof is bounded laterally by inactive packaging regions which the Claims herein recite as being positioned behind the diffracting means. This language is to be considered the equivalent of stating that the active region of the Detector is positioned laterally very close to the Grating (GRT)/Stage (STG), (which is positioned in front of said Detector), so that at least most electromagnetic radiation from Mirror (M1), which just passes by said Grating (GRT)/Stage (STG), enters the laterally immediately adjacent active region. Also, Filter (F1) is a made of a clear material (eg. polymer) which cuts-off ultraviolet wavelengths from other than accessed (+/−) First Orders, and Filter (F2) is a Bandpass which deletes specific wavelengths. Both (F1) and (F2) Filters are generally available. The base of the Spectrometer (PCC) is typically a printed copper backed circuit board with the plug being etched into the copper thereon. And, the preferred computer system for analyzing Detector generated signals operates on an IBM compatible computer system.

Finally, it is to be appreciated that Claims language is structured using "at least one" where typically only one of the subject elements will be present. This is only for the purpose of avoiding Claim interpretation to the end the that use of the word "a" or "an", especially following the word "comprising" is limiting, as has been interpretation in some recent litigation.

Having hereby disclosed the subject matter of the present invention, it should be apparent that many modifications, substitutions, and variations of the present invention are possible in light thereof. It is to be understood that the present invention can be practiced other than as specifically described and should be limited in scope and breadth only by the appended Claims.

We claim:

1. A spectrometer system comprising sequentially, as encountered by entered electromagnetic radiation:
    a) at least one means for receiving electromagnetic radiation;
    b) a first reflecting means with a focal length less than two-hundred-fifty (250) millimeters;
    c) at least one diffracting means;
    d) a second reflecting means with a focal length less than two-hundred-fifty (250) millimeters; and
    e) at least one detector means consisting of centrally located active detectors and laterally disposed packaging, said diffracting means being mounted on a stage which is positioned physically between said detector means on one side thereof, and said first and second reflecting means on a second side thereof; such that, in use, electromagnetic radiation is caused to enter said means for receiving electromagnetic radiation and reflect from said first reflecting means, then interact with said diffracting means such that a diffracted spectrum of electromagnetic radiation is caused to reflect from said second reflecting means and enter said detector means, in which spectrometer system the first reflecting means has a focal length which is less than that of said second reflecting means and in which spectrometer system at least part of the detector means laterally disposed packaging is positioned behind said diffracting means in the sense that electromagnetic radiation reflecting from said second reflecting means is blocked direct access thereto by said diffracting means.

2. A spectrometer system as in claim 1, wherein said means for receiving electromagnetic radiation comprises a slit with dimensions of between five (5) to thirty (30) microns by one-hundred (100) to two-thousand (2000) microns, and in which further, one selection is made from the group consisting of:

the focal length of said first reflecting means is in the range of fifty (50) to seventy (70) millimeters, and the focal length of said second reflecting means is in the range of sixty (60) to ninty (90) millimeters; and the focal length of said first reflecting means is on the order of eighty (80) millimeters to one-hundred-twenty (120) millimeters, and the focal length of said second reflecting means is on the order of one-hundred-twenty (120) to one-hundred-sixty (160) milimeters.

3. A spectrometer system as in claim 1, in which said stage is rotatable.

4. A spectrometer system as in claim 1, in which said means for receiving electromagnetic radiation is located on the same side of the diffracting means as is the detector means.

5. A spectrometer system as in claim 1, in which said means for receiving electromagnetic radiation comprises a means for accepting a fiber optic.

6. A spectrometer system as in claim 1, which further comprises a printed circuit board with plug means for effecting electrical contact to an expansion slot in a computer system, said spectrometer system being mounted to said printed circuit board via vibration absorbing and stress relieving means.

7. A spectrometer system as in claim 1, in which said detector means comprises electrical contact pins suitable for mounting to integrated circuit sockets and to printed circuit boards, wherein said detector means is, however, mounted by other than physical interconnection to said electrical contact pins, and wherein said electrical contact pins are electrically accessed via stress relieving flexible means.

8. A spectrometer system as in claim 1, which further comprises a computing means to which said detector means is electrically interconnected, such that in use signal(s) corresponding to detected electromagnetic radiation is/are input to said computing means by said detector means.

9. A spectrometer system as in claim 1, which further comprises a filter means placed prior to said detector means.

10. A spectrometer system as in claim 9, in which said filter means placed prior to said detector means is comprised of the least one element(s) which provide utility selected from the group consisting of:

serving to separate out the wavelengths of other than a first order produced by interaction of said electromagnetic radiation with said diffraction means, from wavelengths of a first order and allow only wavelengths of said first order to enter said detector means; and serving to selectively attenuate certain high intensity signals.

11. A spectrometer system as in claim 1, in which said diffraction means is a grating.

12. A spectrometer system as in claim 1, in which said detector means is selected from the group consisting of:

charge coupled device;

charge injection device; and photo diode array.

13. A spectrometer system as in claim 1 wherein said diffracted spectrum of electromagnetic radiation which is caused to reflect front said second reflecting means and enter said detector means comprises wavelengths in a group selected from;

positive first order; and negative first order.

14. A spectrometer system as in claim 2 wherein the nominal slit with dimensions are seventeen (17) by one-thousand (1000) microns; and wherein nominal focal length of said first reflecting means is selected from the group consisting of:

sixty (60) millimeters and one-hundred (100) milimeters;

and the nominal focal length of said second reflecting means is selected from the group consisting of:

seventy-five (75) milimeters; and one-hundred forty (140) milimeters.

15. A semiconductor process end-point detecting system comprising a spectrometer system which sequentially comprises, as encountered by entered electromagnetic radiation:

a) at least one means for receiving electromagnetic radiation;

b) a first reflecting means with a focal length less than two-hundred-fifty (250) millimeters;

c) at least one diffracting means;

d) a second reflecting means with a focal length less than two-hundred-fifty (250) millimeters; and e) at least one detector means consisting of centrally located active detectors and laterally disposed packaging;

said diffracting means being mounted on a stage which is positioned physically between said detector means on one side thereof, and said first and second reflecting means on a second side thereof; such that, in use, electromagnetic radiation is caused to enter said means for receiving electromagnetic radiation and reflect from said first reflecting means, then interact with said diffracting means such that a diffracted spectrum of electromagnetic radiation is caused to reflect from said second reflecting means and enter said detector means, in which spectrometer system the first reflecting means has a focal length which is less than that of said second reflecting means and in which spectrometer system at least part of the detector means laterally disposed packaging is positioned behind said diffracting means in the sense that electromagnetic radiation reflecting from said second reflecting means is blocked direct access thereto by said diffracting means.

16. A semiconductor process end-point detecting system as in claim 15, wherein said means for receiving electromagnetic radiation comprises a slit with dimensions of between five (5) to thirty (30) microns by one-hundred (100) to two-thousand (2000) microns, and in which further, one selection is made from the group consisting of:

the focal length of said first reflecting means is in the range of fifty (50) to seventy (70) millimeters, and the focal length of said second reflecting means is in the range of sixty (60) to ninty (90) millimeters; and the focal length of said first reflecting means is on the order of eighty (80) millimeters to one-hundred-twenty (120) millimeters, and the focal length of said second reflecting means is on the order of one-hundred-twenty (120) to one-hundred-sixty (160) milimeters.

17. A semiconductor process end-point detecting system as in claim 15, in which said stage is rotatable.

18. A semiconductor process end-point detecting system as in claim 15, in which said means for receiving electromagnetic radiation is located on the same side of the diffracting means as is the detector means.

19. A semiconductor process end-point detecting system as in claim 15, in which said means for receiving electromagnetic radiation comprises a means for accepting a fiber optic.

20. A semiconductor process end-point detecting system as in claim 15, which further comprises a printed circuit board with plug means for effecting electrical contact to an expansion slot in a computer system, said spectrometer system being mounted to said printed circuit board via vibration absorbing and stress relieving means.

21. A semiconductor process end-point detecting system as in claim 15, in which said detector means comprises electrical contact pins suitable for mounting to integrated circuit sockets and to printed circuit boards, wherein said detector means is, however, mounted by other than physical interconnection to said electrical contact pins, and wherein said electrical contact pins are electrically accessed via stress relieving flexible means.

22. A semiconductor process end-point detecting system as in claim 15, which further comprises a computing means to which said detector means is electrically interconnected, such that in use signal(s) corresponding to detected electromagnetic radiation is/are input to said computing means by said detector means.

23. A semiconductor process end-point detecting system as in claim 15, which further comprises a filter means placed prior to said detector means.

24. A semiconductor process end-point detecting system as in claim 23, in which said filter means placed prior to said detector means serves to separate out the wavelengths of other than a first order produced by interaction of said electromagnetic radiation with said diffraction means, from wavelengths of a first order and allow only wavelengths of said first order to enter said detector means.

25. A semiconductor process end-point detecting system as in claim 15, in which said diffraction means is a grating.

26. A semiconductor process end-point detecting system as in claim 15, in which said detector means is selected from the group consisting of:

Charge Coupled Device;

Charge Injection Device; and

Photo Diode Array.

27. A semiconductor process end-point detecting system as in claim 15, which further comprises a means for effecting plasma etching of semiconductor comprising:

a) at least one vacuum chamber in which a semiconductor system to be etched is present during use;

b) at least one means for entering etching gas to said vacuum chamber;

c) at least one means for applying electrical energy to said etching gas;

d) at least one means for accessing electromagnetic radiation present in said vacuum chamber during a semiconductor etching process; and e) at least one means for guiding said accessed electromagnetic radiation into said spectrometer system means for receiving a electromagnetic radiation.

28. A spectrometer system as in claim 16 wherein the nominal slit with dimensions are seventeen (17) by one-thousand (1000) microns; and wherein nominal focal length of said first reflecting means is selected from the group consisting of:

sixty (60) millimeters; and one-hundred (100) milimeters;

and the nominal focal length of said second reflecting means is selected from the group consisting of:

seventy-five (75) milimeters; and one-hundred-forty (140) milimeters.

29. A semiconductor etch end-point detecting system comprising a spectrometer system which sequentially comprises, as encountered by entered electromagnetic radiation:

a) at least one means for receiving electromagnetic radiation;

b) at least one first reflecting means with a focal length less than two-hundred-fifty (250) millimeters;

c) at least one diffracting means;

d) a second reflecting means with a focal length less than two-hundred-fifty (250) millimeters; and e) at least one detector means consisting of centrally located active detectors and laterally disposed packaging;

said diffracting means being mounted on a stage which is positioned physically between said detector means on one side thereof, and said first and second reflecting means on a second side thereof; such that, in use, electromagnetic radiation is caused to enter said means for receiving electromagnetic radiation and reflect from said first reflecting means, then interact with said diffracting means such that a diffracted spectrum of electromagnetic radiation is caused to reflect from said second reflecting means and enter said detector means, in which spectrometer system the first reflecting means has a focal length which is less than that of said second reflecting means and in which spectrometer system at least part of the detector means laterally disposed packaging is positioned behind said diffracting means in the sense that electromagnetic radiation reflecting from said second reflecting means is blocked direct access thereto by said diffracting means;

said semiconductor etch end-point detecting system further including, in function combination with said spectrometer system, a means for effecting plasma etching of semiconductor comprising:

a) at least one vacuum chamber in which a semiconductor system to be etched is present during use;

b) at least one means for entering etching gas to said vacuum chamber;

c) at least one means for applying electrical energy to said etching gas;

d) at least one means for accessing electromagnetic radiation present in said vacuum chamber during a semiconductor etching process; and e) at least one means for guiding said accessed electromagnetic radiation into said spectrometer system means for receiving a electromagnetic radiation.

30. A method of identifying semiconductor etch end points comprising:

A) providing a semiconductor etch end-point detecting system comprising a spectrometer system which sequentially comprises, as encountered by entered electromagnetic radiation:

a) at least one means for receiving electromagnetic radiation;

b) a first reflecting means with a focal length less than two-hundred-fifty (250) millimeters;

c) at least one diffracting means;

d) a second reflecting means with a focal length less than two-hundred-fifty (250) millimeters; and e) at least one detector means consisting of centrally located active detectors and laterally disposed packaging;

said diffracting means being mounted on a stage which is positioned physically between said detector means on one side thereof, and said first and second reflecting means on a second side thereof; such that, in use, electromagnetic radiation is caused to enter said means for receiving electromagnetic radiation and reflect from said first reflecting means, then interact with said diffracting means such that a diffracted spectrum of electromagnetic radiation is caused to reflect from said second reflecting means and enter said detector means, in which spectrometer system the first reflecting means has a focal length which is less than that of said second reflecting means;

said semiconductor etch endpoint detecting system further including, in function combination with said spectrometer system, a means for effecting plasma etching of semiconductor comprising:

a) at least one vacuum chamber in which a semiconductor system to be etched is present during use;

b) at least one means for entering etching gas to said vacuum chamber;

c) at least one means for applying electrical energy to said etching gas;

d) at least one means for accessing electromagnetic radiation present in said vacuum chamber during a semiconductor etching process; and e) at least one means for guiding said accessed electromagnetic radiation into said spectrometer system means for receiving a electromagnetic radiation;

said method of identifying semiconductor etch end points further comprising chronologically repeatedly performing steps B through F in an evolving windowed factor analysis sequence until detecting semiconductor etch end point; said steps B through F being:

B) during a semiconductor etch procedure in said vacuum chamber, obtaining a chronological sequence of electromagnetic radiation intensity vs. wavelength spectra from said spectrometer system detector means, said spectrometer system detector means being caused to access electromagnetic radiation present in said vacuum chamber during a semiconductor etching process;

C) selecting some number of electromagnetic radiation intensity vs. wavelength spectra from said chronological sequence of electromagnetic radiation intensity vs. wavelength spectra and forming them into a data matrix;

D) optionally selecting and deleting some set-off number of rows and/or columns in said data matrix;

E) by applying mathematical matrix decomposition techniques to said data matrix determining value(s) of at least one representative parameter(s), each said representative parameter(s) being selected from the group consisting of:

members of a diagonal matrix; and eigenvalues;

F) detecting semiconductor etch end point based upon change in said repeatedly calculated at least one representative parameter value(s) resulting from said chronologically repeated performance of steps B through F.

31. A method of identifying semiconductor etch end points as in claim 30, which further comprises at least one step selected from the group consisting of:

a) in conjunction with said step B obtaining of a chronological sequence of electromagnetic radiation intensity vs. wavelength spectra from said detector means, the performing of signal to noise ratio enhancing techniques such that said each of said electromagnetic radiation intensity vs. wavelength spectra in said chronological sequence thereof utilized to form said data matrix in step C are composite electromagnetic radiation intensity vs. wavelength spectra with improved signal to noise ratios; and b) in conjunction with said step C the step of identifying critical wavelengths and deleting intensity values at other wavelengths in said spectra.

32. A method of identifying semiconductor etch end points in real time comprising chronologically repeatedly performing steps a through f in an evolving windowed factor analysis sequence until detecting semiconductor etch end point, said steps a through f being;

a) while performing a semiconductor etch procedure in a vacuum chamber, obtaining a chronological sequence of electromagnetic radiation intensity vs. wavelength spectra from a detector means, said detector means being positioned so as to receive electromagnetic radiation eminating from said vacuum chamber during said semiconductor etch procedure;

b) selecting a period of time and for each of a sequence of said selected time periods performing signal to noise ratio enhancing technique(s) to two or more electromagnetic radiation intensity vs. wavelength spectra obtained thereduring, with the result being a chronological sequence of composite spectra with improved signal to noise ratios;

c) selecting some number of composite spectra in said chronological sequence of composite spectra, and forming them into a data matrix consisting of a definite number of rows and columns;

d) optionally selecting and deleting some set-off number of rows and/or columns in said data matrix;

e) by mathematical matrix decomposition techniques determining values for at least one representative parameter(s) selected from the group consisting of:
        members of a diagonal matrix; and
        eigenvalues;
which representative parameter(s) monitor changes in said chronological sequence of composite spectra;

f) detecting semiconductor etch end point based upon change in said repeatedly calculated at least one representative parameter value(s) resulting from said chronologically repeated performance of steps a through f.

33. A method of identifying semiconductor etch end points in real time as in claim 32 which further comprises the step of identifying critical wavelengths and deleting intensity values at other wavelengths in said composite spectra.

34. A method of identifying semiconductor etch end points in real time comprising chronologically repeatedly performing steps a through e in an evolving windowed factor analysis sequence until detecting semiconductor etch end point, said steps a through e being:

a) while performing a semiconductor etch procedure in a vacuum chamber, obtaining a chronological sequence of electromagnetic radiation intensity vs. wavelength spectra from a detector means, said detector means being positioned so as to receive electromagnetic radiation eminating from said vacuum chamber during said semiconductor etch procedure;

b) selecting some number of electromagnetic radiation intensity vs. wavelengths spectra in said chronological sequence of electromagnetic radiation intensity vs. wavelengths spectra, and forming them into a data matrix consisting of a definite number of rows and columns;

c) selecting and deleting some set-off number of rows and/or columns in said data matrix;

d) by mathematical matrix decomposition techniques determining values for at least one representative parameter(s) selected from the group consisting of:
        members of a diagonal matrix; and
        eigenvalues;
which representative parameter(s) monitor changes in said chronological sequence of electromagnetic radiation intensity vs. wavelength spectra;

e) detecting semiconductor etch end point based upon change in said repeatedly calculated at least one representative parameter value(s) resulting from said chronologically repeated performance of steps a through e.

35. A method of identifying semiconductor etch end points in real time as in claim 34 which further comprises at least one step selected from the group consisting of:

a) in conjunction with said step b obtaining of a chronological sequence of electromagnetic radiation intensity vs. wavelength spectra from said detector means, the performing signal to noise ratio enhancing technique(s), such that said each of said electromagnetic radiation intensity vs. wavelength spectra in said chronological sequence thereof utilized to form said data matrix are composite electromagnetic radiation intensity vs. wavelength spectra with improved signal to noise ratios; and b) identifying critical wavelengths and deleting intensity values at other wavelengths in said obtained electromagnetic radiation intensity vs. wavelength spectra.

36. A method of identifying semiconductor etch end points in real time comprising chronologically repeatedly performing steps a through g in an evolving windowed factor analysis sequence until detecting semiconductor etch end point, said steps a through g being:

a) by performing test semiconductor etch procedures in a vacuum chamber, determining, on a pixel by pixel basis, mean and standard deviations for a normal chronological sequence of electromagnetic radiation intensity vs. wavelength spectra from data obtained from a detector means, said detector means being positioned so as to receive electromagnetic radiation eminating from said vacuum chamber during said semiconductor etch procedure;

b) while performing an actual real time semiconductor etch procedure in a vacuum chamber, obtaining, on a pixel by pixel basis, a chronological sequence of electromagnetic radiation intensity vs. wavelength spectra from a detector means, said detector means being positioned so as to receive electromagnetic radiation eminating from said vacuum chamber during said semiconductor etch procedure;

c) on a pixel by pixel basis, for a normal chronological sequence of electromagnetic radiation intensity vs. wavelength spectra from data obtained from a detector means, subtracting said normal mean from corresponding obtained real time semiconductor etch procedure values, and dividing the result by the corresponding normal data standard deviation, and forming a reduced electromagnetic radiation intensity vs. wavelengths spectra;

d) selecting some number of reduced electromagnetic radiation intensity vs. wavelengths spectra in said chronological sequence of electromagnetic radiation intensity vs. wavelengths spectra, and forming them into a data matrix consisting of a definite number of rows and columns;

e) optionally selecting and deleting some set-off number of rows and/or columns in said data matrix;

f) by mathematical matrix decomposition techniques determining values for at least one representative parameter(s) selected from the group consisting of:
   members of a diagonal matrix and
   eigenvalues;

which representative parameter(s) monitor changes in said chronological sequence of new electromagnetic radiation intensity vs. wavelength spectra;

g) detecting semiconductor etch end point based upon change in said repeatedly calculated at least one representative parameter value(s) resulting from said chronologically repeated performance of steps a through g.

37. A method of identifying semiconductor etch end points in real time as in claim 36 which further comprises at least one step selected from the group consisting of:

a) in conjunction with said step b obtaining of a chronological sequence of electromagnetic radiation intensity vs. wavelength spectra from said detector means, the performing signal to noise ratio enhancing technique (s), such that said each of said electromagnetic radiation intensity vs. wavelength spectra in said chronological sequence thereof utilized to form said data matrix are composite electromagnetic radiation intensity vs. wavelength spectra with improved signal to noise ratios; and b) identifying critical wavelengths and deleting intensity values at other wavelengths in said obtained electromagnetic radiation intensity vs. wavelength spectra.

38. A method of identifying semiconductor etch end points in real time as in claim 28 in which step b is selected and in which the critical wavelengths are identified by use of wavelength "Mask Filter" which passes a set of relevant wavelengths to a detector, while blocking other wavelengths.

39. A method of identifying semiconductor etch end points in real time as in claim 35 in which step b is selected and in which the critical wavelengths are identified by use of wavelength "Mask Filter" which passes a set of relevant wavelengths to a detector, while blocking other wavelengths.

40. A method of identifying semiconductor etch end points in real time as in claim 37 in which step b is selected and in which the critical wavelengths are identified by use of wavelength "Mask Filter" which passes a set of relevant wavelengths to a detector, while blocking other wavelengths.

* * * * *